United States Patent
Okamoto et al.

(10) Patent No.: US 9,854,108 B2
(45) Date of Patent: Dec. 26, 2017

(54) PRINTING MANAGEMENT SERVER, PRINTING SYSTEM, AND PRINTING MANAGEMENT METHOD

(71) Applicant: SEIKO EPSON CORPORATION, Tokyo (JP)

(72) Inventors: Takeshi Okamoto, Nagano (JP); Fumio Nagasaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/880,171

(22) Filed: Oct. 9, 2015

(65) Prior Publication Data

US 2016/0127577 A1 May 5, 2016

(30) Foreign Application Priority Data

Oct. 29, 2014 (JP) ................................. 2014-220580
Oct. 29, 2014 (JP) ................................. 2014-220581

(51) Int. Cl.
*H04N 1/00* (2006.01)
*G06F 3/12* (2006.01)
*G06K 15/02* (2006.01)

(52) U.S. Cl.
CPC ....... *H04N 1/00212* (2013.01); *G06F 3/1204* (2013.01); *G06F 3/1219* (2013.01); *G06F 3/1222* (2013.01); *G06F 3/1238* (2013.01); *G06K 15/02* (2013.01); *H04N 1/00244* (2013.01); *H04N 2201/3212* (2013.01); *H04N 2201/3233* (2013.01); *H04N 2201/3235* (2013.01)

(58) Field of Classification Search
None
See application file for complete search history.

(56) References Cited

U.S. PATENT DOCUMENTS

| 6,157,706 A | * | 12/2000 | Rachelson | ............ H04L 51/066 379/100.08 |
| 9,665,320 B2 | * | 5/2017 | Nishida | ................. G06F 3/1222 |
| 2003/0063309 A1 | * | 4/2003 | Parry | ................... G06K 15/005 358/1.15 |
| 2004/0073684 A1 | * | 4/2004 | Jodra | ................. H04N 1/00244 709/228 |

(Continued)

FOREIGN PATENT DOCUMENTS

| JP | 2002-132638 A | 5/2002 |
| WO | 2013/057787 A1 | 4/2013 |

*Primary Examiner* — Beniyam Menberu
(74) *Attorney, Agent, or Firm* — Global IP Counselors, LLP

(57) ABSTRACT

A printing management server includes an identification information management unit that manages identification information uniquely associated with an email address assigned to a printer, a print request receiving unit that receives a print request that is a request to print content and that accompanies the identification information, and a print instructing unit that designates an email address, corresponding to the identification information accompanying the print request specified by the identification information management unit, to an email printing server that causes a printer corresponding to a designated email address to execute a print, and instructs the email printing server to cause the printer corresponding to the designated email address to print content included in the print request.

4 Claims, 6 Drawing Sheets

(56) References Cited

U.S. PATENT DOCUMENTS

| | | | | |
|---|---|---|---|---|
| 2008/0062883 A1* | 3/2008 | Shima | ............... | G06F 11/006 370/241 |
| 2009/0244645 A1* | 10/2009 | Shigematsu | ....... | H04N 1/00212 358/440 |
| 2010/0134818 A1* | 6/2010 | Minamizono | ......... | G06F 3/1288 358/1.13 |
| 2012/0188600 A1* | 7/2012 | Oshima | ............... | G06F 3/1205 358/1.15 |
| 2012/0194863 A1* | 8/2012 | Oshima | ............... | G06F 3/1204 358/1.15 |
| 2012/0194864 A1* | 8/2012 | Oshima | ............... | G06F 3/1204 358/1.15 |
| 2013/0094048 A1 | 4/2013 | Sako | | |
| 2013/0148797 A1* | 6/2013 | Toscano | ............... | H04L 51/066 379/100.08 |
| 2013/0308165 A1* | 11/2013 | Venkatesh | ............. | G06F 3/1205 358/1.15 |
| 2013/0321855 A1* | 12/2013 | Bhatia | .................... | H04L 63/10 358/1.15 |
| 2013/0329246 A1* | 12/2013 | Parida | ................. | G06F 3/1203 358/1.15 |
| 2014/0268219 A1* | 9/2014 | Ho | .................... | H04N 1/00209 358/1.15 |
| 2014/0373103 A1* | 12/2014 | Hirata | ................. | G06F 21/608 726/4 |
| 2015/0096015 A1* | 4/2015 | Ren | ........................ | G06F 21/35 726/20 |
| 2016/0344878 A1* | 11/2016 | Asthana | ............... | G06F 3/1222 |

* cited by examiner

FIG. 3A

IDENTIFICATION INFORMATION DB 25

| USER ID (A) | IDENTIFICATION INFORMATION | PRINTER EMAIL ADDRESS | PSP MANAGEMENT ID |
|---|---|---|---|
| 140001 | #3356-1234 | foo@print.abcd.com | ...... |
| 140002 | #3434-7878 | bar@hijkprint.com | ...... |
| ...... | ...... | ...... | ...... |

FIG. 3B

USER INFORMATION DB 65

| USER ID (B) | IDENTIFICATION INFORMATION | USER INFORMATION |
|---|---|---|
| A00-5001 | #3356-1234 | ANYTOWN, SAITAMA PREFECTURE; THIRTIES; MALE; ... |
| A00-5002 | #3434-7878 | ANYTOWN, OKINAWA PREFECTURE; FIFTIES; FEMALE; ... |
| ...... | ...... | ...... |

PRINTING MANAGEMENT SERVER, PRINTING SYSTEM, AND PRINTING MANAGEMENT METHOD

CROSS REFERENCES TO RELATED APPLICATIONS

This application claims priority to Japanese Application No. 2014-220580, filed Oct. 29, 2014 and No. 2014-220581, filed Oct. 29, 2014, the entirety of which are incorporated by reference herein.

BACKGROUND

1. Technical Field

The present invention relates to printing management servers, printing systems, and printing management methods.

2. Related Art

A computing system that enables the body of an email, files attached to the email, and the like to be printed by a printer by sending the email to an email address assigned to the printer (called an "email printing system" hereinafter) is known.

Meanwhile, an Internet printing system in which information on the Internet is sent, based on a request from a mobile terminal, to an image forming apparatus via a printing reception HP host server so as to output printed material is known as a technique similar to an email printing system (see JP-A-2002-132638).

Furthermore, a printing system is known in which a terminal sends a printing service search request to a network, and a printing device sends a response upon receiving the printing service search request (the printing device sends an authentication token with this response); when sending print data in an email, the terminal also sends the authentication token, and printing is permitted in the case where the authentication token sent by the terminal matches the authentication token held by the printing device (see WO 2013/057787).

In an email printing system, anyone who knows the email address assigned to the printer can cause the printer corresponding to that email address to output printed material. There has thus been a problem in that if the email address is leaked to someone, and that person sends an email to that email address, printed material not needed by the user of the printer will be outputted from that printer.

The stated WO 2013/057787 uses authentication by authentication token as a measure against email address leaks. However, the method according to the stated WO 2013/057787 has a problem in that the exchange of authentication tokens between the terminal and the printing device leading up to the actual execution of printing is complicated, and thus increases the amount of communication in the system and places an increased burden on the server.

SUMMARY

An advantage of some aspects of the invention is to provide a printing management server, a printing system, and a printing management method that improve benefits to a user of a printer by eliminating unnecessary printing resulting from email address leaks.

According to one aspect of the invention, a printing management server includes an identification information management unit that manages identification information uniquely associated with an email address assigned to a printer, a print request receiving unit that receives a print request that is a request to print content and that accompanies the identification information, and a print instructing unit that designates an email address, corresponding to the identification information accompanying the print request specified by the identification information management unit, to an email printing server that causes a printer corresponding to a designated email address to execute a print, and instructs the email printing server to cause the printer corresponding to the designated email address to print content included in the print request.

According to this configuration, in the case where a print request for content that accompanies the identification information has been received, the printing management server specifies an email address from that identification information and instructs the email printing server to cause the printer corresponding to that email address to print the content. The identification information itself is information whose meaning cannot be deciphered by a person who sees the information, and thus even if the identification information has been leaked, this leak will not result in the printer email address being leaked. Furthermore, only the printing management server can specify the corresponding email address from the identification information, and thus printing by the printer corresponding to the email address is managed correctly by the printing management server. Accordingly, printing that is unnecessary to the user of the printer can be avoided, which eliminates economic losses for the user due to ink and toner, paper, and so on being consumed.

According to another aspect of the invention, in response to a printer registration request from an external terminal, it is preferable that the identification information management unit generate the identification information associated with an email address assigned to the printer to be registered, register the generated identification information in association with the email address, and send the registered identification information to the external terminal that made the registration request.

According to this configuration, the user of the printer can make the registration request using the external terminal and can know the identification information associated with the email address assigned to the printer. Accordingly, the user of the printer can notify only trusted parties of the known identification information, which makes it possible to prevent the aforementioned unnecessary printing.

Here, a situation in which a plurality of email printing servers that cause printers corresponding to designated email addresses to execute prints are present for each of different businesses can be considered. According to another aspect of the invention, in such an environment, it is preferable that the print instructing unit designate the email address to, of a plurality of email printing servers that administer different email addresses, the email printing server that administers the specified email address, and instruct the stated email printing server to cause the content to be printed.

According to this configuration, the printing management server manages a correspondence relationship between the email addresses assigned to each printer and the identification information, and thus an email printing system constituted of email printing servers run for respectively different businesses can be managed collectively.

According to another aspect of the invention, a server includes a user information management unit that manages user information indicating an attribute of a user in association with an email address assigned to a printer corresponding to the user, a user specifying unit that specifies a user, among users whose user information is managed, to be a delivery target for content, and a print request unit that designates the email address assigned to the printer corresponding to the specified user to a printing service providing server that causes the printer corresponding to the designated email address to print the content.

According to this configuration, in the case where a delivery order for content (content corresponding to some announcement, for example) has been obtained, the server specifies a user to be a delivery target of the content from among the users whose user information is managed, and designates the email address assigned to the printer corresponding to the specified user to the printing service providing server. Accordingly, by using an email printing system (a system realized by the printing service providing server), content can be electronically delivered to multiple users (the printers held by the users) and outputted as printed material, without the party who makes the content delivery order handling the user information, making it possible to greatly reduce the time and costs involved in delivering the content.

According to another aspect of the invention, it is preferable that the user specifying unit accept an input of a condition for a user who serves as the delivery target of the content, and specify one or more users as the delivery target of the content by searching the user information based on the accepted condition.

According to this configuration, the delivery target user is specified and the user information itself is protected (does not leak to the exterior) simply by the party who makes the content delivery order inputting a condition of the user who is the content delivery target to the server.

According to another aspect of the invention, it is preferable that the user information management unit manage the identification information uniquely associated with the email address in association with the user information, and that the print request unit designate, to the printing service providing server, the identification information associated with the email address assigned to the printer corresponding to the designated user.

According to this configuration, the server designates the identification information associated with the email address to the printing service providing server. The identification information itself is information whose meaning cannot be deciphered by a person who sees the information, and thus even if the identification information has been leaked, this leak will not result in the printer email address being leaked. Accordingly, printing that is unnecessary to the user of the printer can be avoided, which eliminates economic losses for the user due to ink and toner, paper, and so on being consumed.

According to another aspect of the invention, it is preferable that the print request unit notify the printing service providing server of the email address or the identification information uniquely associated with the email address from among the information managed by the user information management unit, but not notify the printing service providing server of the user information.

According to this configuration, the user information is prohibited from being leaked from the server to the exterior, which achieves a high level of personal information security.

According to another aspect of the invention, it is preferable that the server further include a point management unit that manages points usable for a predetermined service on a user-by-user basis, and that the point management unit provide a predetermined amount of points to at least some users specified as delivery targets for the content.

According to this configuration, providing the points substantially eliminates the economic cost of printing the content (the consumption of ink and toner, paper, and so on), which makes it possible to eliminate losses for the user of the printer.

The technical spirit of the invention can also be realized by an entity aside from a printing management server. For example, the invention may be realized by a variety of other categories, such as a method that includes steps executed by the respective units of the printing management server (a printing management method), a computer program that causes a computer to execute such a method, and furthermore, a computer-readable storage medium in which such a program is stored.

Furthermore, a printing system including a printing management server and an email printing server that causes a printer corresponding to a designated email address to execute a print, in which the printing management server includes an identification information management unit that manages identification information uniquely associated with an email address assigned to a printer, a print request receiving unit that receives a print request that is a request to print content and that accompanies the identification information, and a print instructing unit that designates an email address, corresponding to the identification information accompanying the print request specified by the identification information management unit, to the email printing server, and instructs the email printing server to cause the printer corresponding to the designated email address to print content included in the print request, and in which the email printing server causes the printer corresponding to the designated email address to print the content included in the print request, can be understood as an aspect of the invention.

BRIEF DESCRIPTION OF THE DRAWINGS

The invention will be described with reference to the accompanying drawings, wherein like numbers reference like elements.

FIGS. 3A and 3B are diagrams illustrating an example of information management in respective databases.

DESCRIPTION OF EXEMPLARY EMBODIMENTS

An embodiment of the invention will be described hereinafter with reference to the drawings.

1. System Overview

Figure 1:
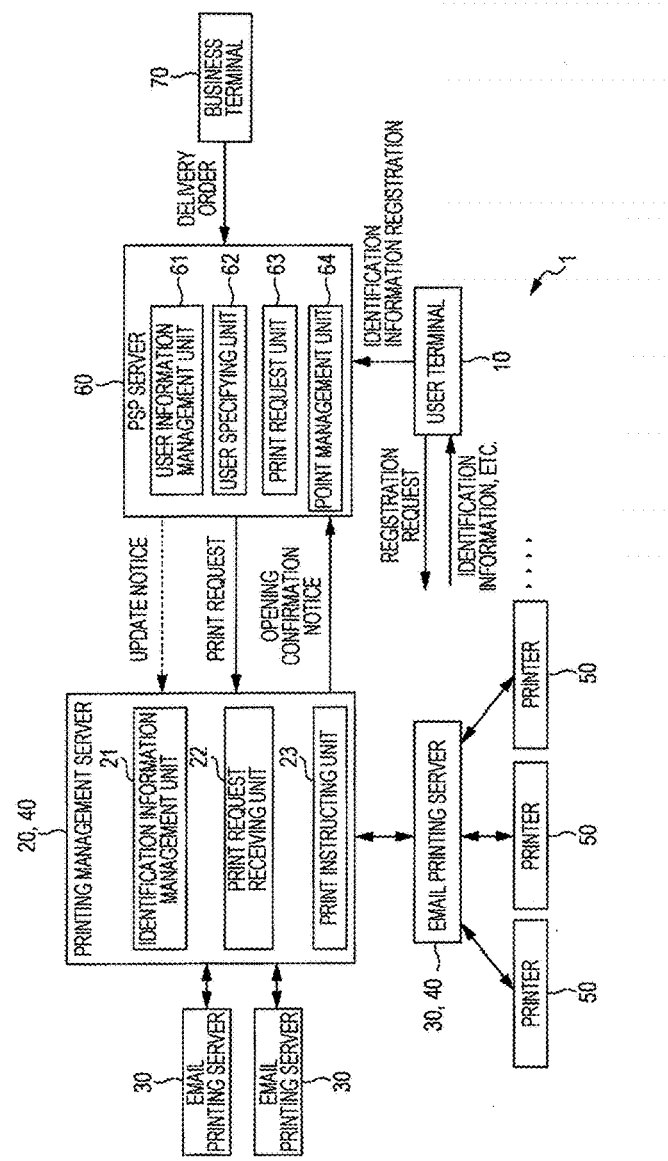
FIG. 1 is a diagram schematically illustrating a system according to an embodiment.

FIG. 1 schematically illustrates the configuration of a system 1 according to this embodiment; in FIG. 1, the system 1 includes a user terminal 10, a printing management server 20, an email printing server 30, a printer 50, a point service provider (PSP) server 60, and a business terminal 70.

These elements 10, 20, 30, 50, 60, and 70 are each valid as an invention, and any combination including some of those elements (a system) is also valid as an invention. Communication among the elements 10, 20, 30, 50, 60, and 70 is communication using an Internet connection, for example, and is implemented according to a protocol (the TCP/IP protocol, the HTTP protocol, or the like) accepted by a standards organization such as the IETF (Internet Engineering Task Force) or the like.

The user terminal 10 is a terminal operated by a user U (see FIG. 2), who is a user of the printer 50. The business terminal 70 is a terminal operated by a businessperson (in, for example, a private company, an administrative organization such as a municipality, or another legal entity or group) that wishes to use this embodiment to make announcements for various reasons (for example, product and service advertisements, administrative notifications to residents, and so on). Details of these announcements are also referred to as "content" hereinafter. All terminals having a function for connecting to a predetermined network, such as personal computers (PCs), cellular phones, smartphones, tablet terminals, and the like, correspond to the stated "terminals". Furthermore, "server" is not limited to a single server housed within a single housing, and also refers to a collection of multiple servers that implement predetermined functions by operating cooperatively.

The email printing server 30 is an example of a server for realizing an email printing system, and causes the printer 50 corresponding to a specified email address (called a "printer email address" hereinafter) to execute a print. A plurality (several tens of thousands, several hundreds of thousands, or more) printers 50, to each of which a printer email address has been assigned, are registered in the email printing server 30. FIG. 1 illustrates an example in which a plurality of email printing servers 30 are present, for reference. Hereinafter, in the case where a given printer 50 has been registered in a given email printing server 30, the email printing server 30 may also be referred to as "administering" that printer 50, the printer email address assigned to that printer 50, and so on.

By managing "identification information" associated uniquely with the printer email addresses assigned to the printers 50, the printing management server 20 can collectively manage printing by the printers 50 respectively administered by the plurality of email printing servers 30. The printing management server 20 includes an identification information database (DB) 25 (see FIGS. 2 and 5), a print job database (DB) 26 (see FIG. 5), and so on. In the printing management server 20, various types of functions, such as those of an identification information management unit 21, a print request receiving unit 22, a print instructing unit 23, and so on, are realized by hardware such as a CPU, a ROM, a RAM, a storage device (a hard disk or the like), other memories, and so on operating cooperatively with installed programs. Details of these various types of functions will be given later.

The respective roles of the email printing server 30 and the printing management server 20 are not necessarily clearly defined. For example, at least part of the role of the email printing server 30, which will be described later, may be handled by the printing management server 20 instead, and likewise, at least part of the role of the printing management server 20 may be handled by the email printing server 30 instead. In terms of achieving functions for causing the printer 50 corresponding to a directly- or indirectly-designated printer email address to print content, the email printing server 30 and/or the printing management server 20 may be referred to as a printing service providing server 40 or the like.

The PSP server 60 is a server managed and operated by a PSP. A PSP is a company, an administrative organization, or another legal entity or group that runs an operation for providing points that can be used for a predetermined service to users registered with the PSP (called "PSP registered users" hereinafter). For example, a PSP gives, to a PSP registered user, points based on the prices of items purchased by that PSP registered user at an affiliated business (including a variety of business, such as supermarkets, convenience stores, apparel shops, restaurants, video rental shops, gas stations, rail/bus/airline companies, and so on). The PSP registered user can then exchange the provided points for products, services, and so on at the PSP's affiliated business. Such granting and usage of points is carried out, for example, at the shop at the time of purchase or the like, using a point card carried by the PSP registered user. Such a relationship between the PSP and the PSP registered user is typical, and is not a situation unique to this embodiment.

One characteristic of a PSP is that the PSP holds personal information (also called "user information") for each of a large number of PSP registered users. For large-scale PSPs located within Japan, the number of PSP registered users is in the several tens of millions. When a user registers with a PSP, the user generally discloses basic personal attributes, such as his/her name, address (residence), contact information (telephone number or the like), sex, age (age group), and so on as the user information to the PSP, whereupon the user is validated as a PSP registered user. Furthermore, the PSP holds detailed personal attributes, such as the PSP registered user s product and service purchase history, personal tastes obtained by analyzing the purchase history (tastes such as liking sports, for example), and so on, as a type of the user information for each PSP registered user. The PSP server 60 includes a user information database (DB) 65 (see FIG. 5) in which such user information is saved. In the PSP server 60, various types of functions, such as those of a user information management unit 61, a user specifying unit 62, a print request unit 63, a point management unit 64, and so on, are realized by hardware such as a CPU, a ROM, a RAM, a storage device (a hard disk or the like), other memories, and so on operating cooperatively with installed programs. Details of these various types of functions will be given later.

2. Issuing Identification Information

Next, the issuing of identification information to the user U will be described. The user U having registered the printer 50 that s/he uses in any email printing server 30 (see JP-A-2012-159914 or the like as necessary) is a prerequisite for the identification information to be issued. "Registering the printer 50 in any email printing server 30" specifically refers to a process in which a user is registered in any of email printing systems run by individual printer makers (that is, a process in which the printer 50 is registered). For example, the user U, who has purchased a printer 50 manufactured by printer maker A, registers the purchased printer 50 in an email printing system (the email printing server 30) run by the printer maker A (or a business affiliated with the printer maker A).

Figure 2:
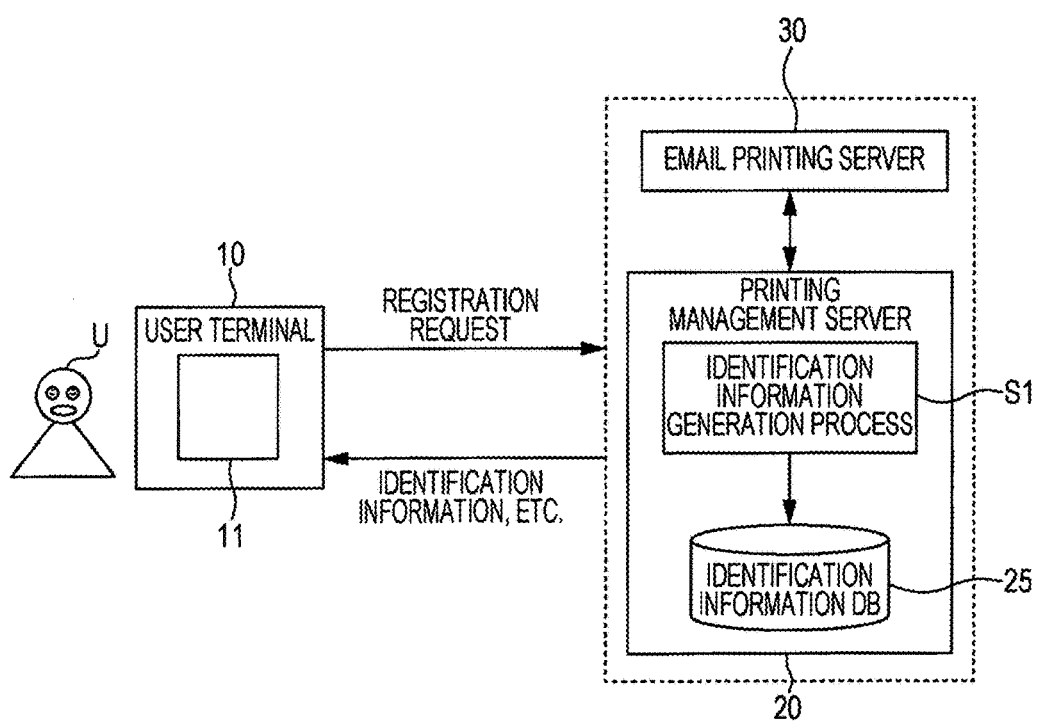
FIG. 2 is a diagram schematically illustrating an example of a process through which identification information is issued.

FIG. 2 is a diagram schematically illustrating an example of a process through which the identification information is issued.

The user U of the printer 50 sends a registration request to the printer 50 by operating the user terminal 10. Such registration request is executed through a GUI (Graphical User Interface) in a web page provided by the email printing server 30 over an Internet connection, for example. Although this printer 50 registration will not be described in detail, information unique to the particular printer 50 (a unique model ID, a serial number, or the like), predetermined information related to the user U, or the like is registered in the email printing server 30, and as a response thereto, the email printing server 30 generates a unique printer email address assigned to the printer 50 that is being registered.

Along with the generation of the printer email address, in the printing management server 20, the identification information management unit 21 generates identification information associated with the generated printer email address (an identification information generation process S1). The identification information is information whose meaning cannot be deciphered by a person viewing the information, and may be any information that can ensure the printer email address remains secret outside of the system. The identification information management unit 21 generates the identification information by using a hash function, for example. In other words, data of a constant length (a hash value) is calculated by inputting a given character string into the hash function, and the hash value is then associated with a single printer email address as the identification information. Of course, the method for generating the identification information is not limited to a method that uses a hash function, and for example, information encrypted using a predetermined encryption method based on the character string that constitutes the generated printer email address may be used as the identification information.

The identification information management unit 21 associates the printer email address assigned to the printer 50 being registered and the identification information generated for association with that printer email address with a unique user ID (A) and newly registers (saves) these in the identification information DB 25. The user ID (A) is an ID provided by the printing management server 20 for each individual user in order to manage each of the large number of users handled by the respective multiple email printing servers 30. Note that the letter (A) in the user ID (A) is nothing more than an expression added as appropriate in order to distinguish the corresponding user from a user ID (B), which will be mentioned later.

FIG. 3A illustrates an example of information management in the identification information DB 25. The printer email address of a registered printer 50 and the identification information corresponding to that printer email address are saved in the identification information DB 25 in association with the user ID (A) for each user of that printer 50.

The identification information management unit 21 sends (issues) the printer email address assigned to the printer 50 being registered and the identification information associated with the printer email address to the user terminal 10 that sent the aforementioned registration request. Through this, the user U that made the registration request for the printer 50 can know the printer email address assigned to that printer 50 and the identification information associated with that printer email address through the user terminal 10.

3. Registration of Identification Information in PSP

The user who now knows the printer email address for the printer 50 and the identification information associated with the printer email address registers the identification information with the PSP as desired.

Figure 4:
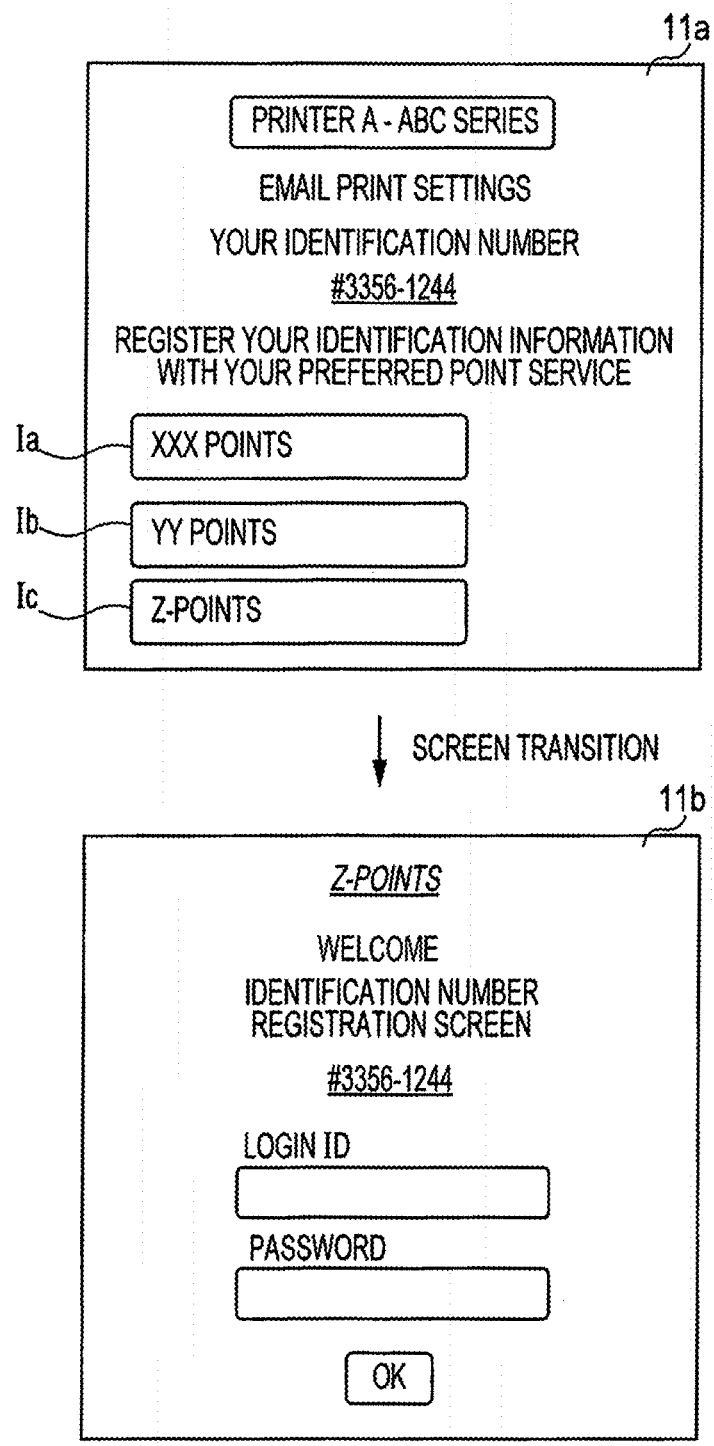
FIG. 4 is a diagram illustrating an example of a web page.

FIG. 4 illustrates an example of a screen transition in a display 11 of the user terminal 10. The identification information sent to the user terminal 10 as described above is displayed (however, in FIG. 4, the printer email address is not displayed) in a web page 11a (a web page provided by the printing management server 20 or the email printing server 30 in which the user U is registered) illustrated in the upper section of FIG. 4. Furthermore, icons Ia, Ib, Ic, and so on indicating one or more PSPs for which the user U can register the identification information at the current point in time are displayed in the web page 11a (for example, a plurality of PSPs identified by their respective names, such as "XXX points", "YY points", "Z-points", and so on).

When the user U manipulating the user terminal 10 selects (clicks, taps, or the like) any of the icons Ia, Ib, Ic, and so on, a jump is made from the web page 11a to a link destination corresponding to the selected icon, or in other words, to a web page 11b provided by the PSP corresponding to the selected icon. As a result, the web page 11b, illustrated in the lower section of FIG. 4, is displayed in the display 11. In FIG. 4, the web page 11b is a web page provided by a PSP (the PSP server 60 illustrated in FIG. 1) that manages and runs "Z-points", as an example. In addition, it is assumed here that the user U is already a "Z-points" member, or in other words, is a "Z-points" PSP registered user.

The user U operates the user terminal 10 and makes a predetermined input in the web page 11b (for example, enters a login ID, password, and so on for logging into a user area for "Z-points" PSP registered users), and furthermore requests the aforementioned identification information be registered in the PSP (that is, makes an operation corresponding to such a request). Note that, as per the example illustrated in FIG. 4, the identification information is passed from the web page 11a to the web page 11b and displayed therein when the aforementioned screen transition occurs. By employing such a configuration, the identification information registration is carried out accurately and smoothly, without the user U needing to re-enter the identification information s/he wishes to register in the web page 11b. The PSP server 60 updates the user information DB 65 using the identification information in the registration request made by the user U in this manner.

FIG. 3B illustrates an example of information management in the user information DB 65. The aforementioned user information is associated with the user ID (B), which differs for each PSP registered user, by the user information management unit 61, and is saved in the user information DB 65 in such a state. The user information management unit 61 registers (saves) the identification information in the registration request made by the aforementioned user U in association with the corresponding user ID (B) and user information. The user information DB 65 is updated as a result. The user ID (B) is the aforementioned login ID, for example.

According to these descriptions, the user information management unit 61 can be called a means that manages identification information uniquely associated with a printer email address in association with user information of a PSP registered user. Meanwhile, the identification information is information that corresponds one-to-one with a printer email address, and can therefore be considered substantially equivalent to the printer email address in terms of its value as information. Accordingly, the user information management unit 61 can also be referred to as a means that manages printer email addresses in association with user information of PSP registered users. It should be noted that if strong measures against information leaks from the PSP server 60 are to be assumed to be in place, this embodiment does not exclude registering the printer email addresses themselves in the user information DB 65 of the PSP server 60.

Once the user information DB 65 has been updated with the identification information in the registration request made by the user U as described above, the user information management unit 61 further sends a notice of the update (an update notice) to the printing management server 20. Specifically, the user information management unit 61 sends, to the printing management server 20, a combination of the identification information involved in the update (the identification information newly registered in the user information DB 65) and its own PSP management ID (of the PSP server 60 that includes the user information management unit 61) (see the broken line arrow in FIG. 1). The PSP management ID is an ID, different for each PSP, given to each PSP (each PSP server) that has entered into a predetermined contract with the printing management server 20. Accordingly, a unique PSP management ID is also given to the PSP server 60 illustrated in FIG. 1 beforehand.

Having received the update notice (the notice including the combination of the identification information and the PSP management ID), the printing management server 20 updates the identification information DB 25 in accordance with the update notice. In other words, the identification information management unit 21 specifies an instance of the identification information registered in the identification information DB 25 that matches the identification information included in the update notice, and associates and registers the specified identification information with the PSP management ID included in the update notice. Through this, the printer email address, the identification information, and the PSP management ID are registered in the identification information DB 25 in association with the user ID (A). As a result, the printing management server 20 can tell which user (which user ID (A)) has registered identification information with a given PSP.

4. Acceptance of Delivery Orders and Print Requests from Businessperson

Figure 5:
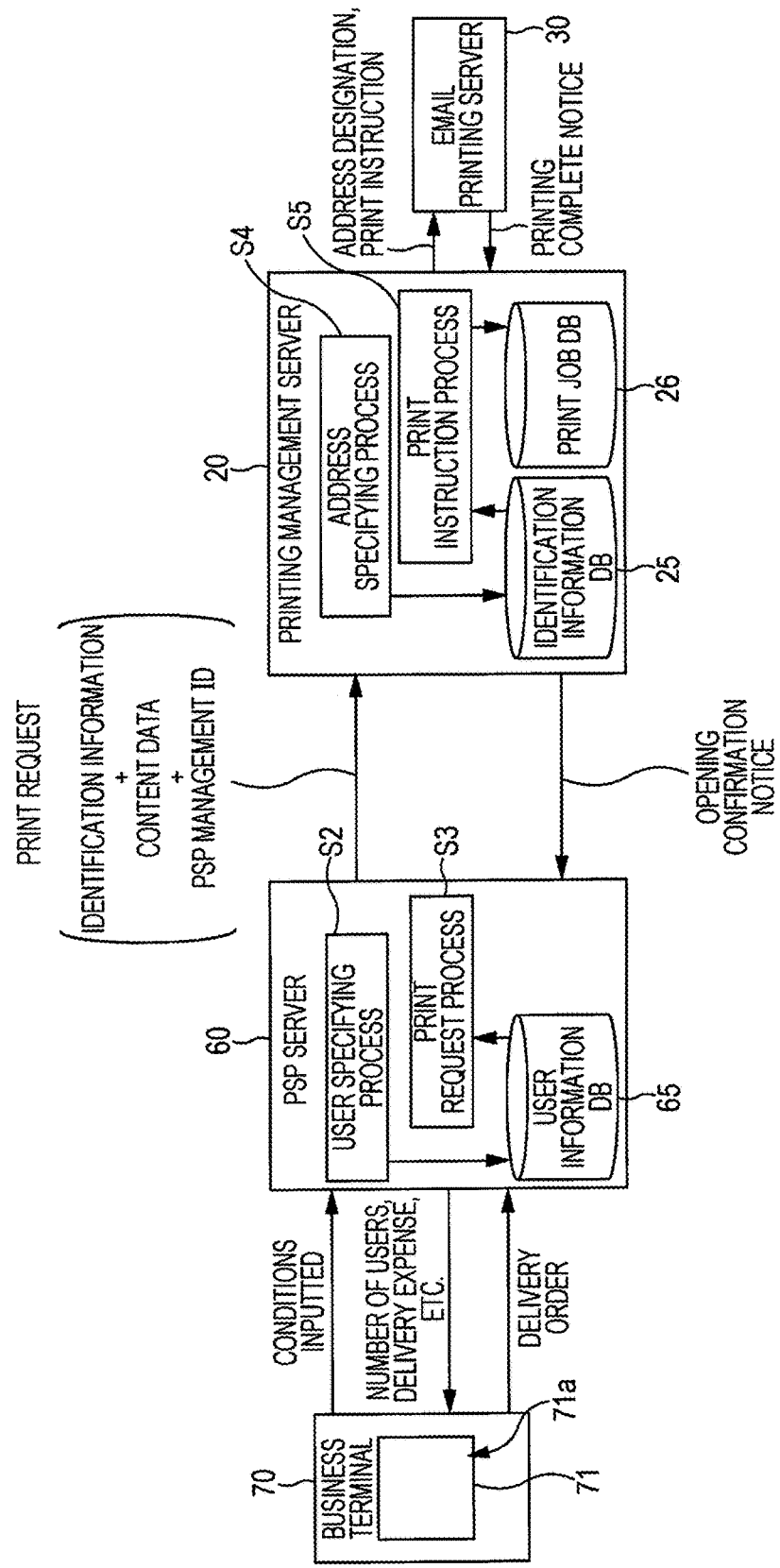
FIG. 5 is a diagram schematically illustrating an example of a process through which content is delivered in response to a businessperson accessing a PSP.

FIG. 5 is a diagram schematically illustrating an example of a process through which content is delivered in response to a businessperson accessing a PSP.

The businessperson starts procedures necessary for a content delivery order by operating the business terminal 70. Such procedures are executed through a GUI in a web page 71a provided by the PSP server 60, for example. The web page 71a is displayed in a display 71 of the business terminal 70. First, the businessperson inputs conditions regarding the users who are content delivery targets, in the web page 71a. A variety of conditions can be considered as being inputted; for example, an area of residence, age group, sex, and so on of the users who are content delivery targets are inputted.

In the PSP server 60, the user specifying unit 62 specifies users who are content delivery targets, from among the PSP registered users whose user information is managed in the user information DB 65, based on the stated input (a user specifying process S2). Specifically, the user specifying unit 62 accepts the conditions inputted through the web page 71a, and specifies one or more users having attributes that match those conditions by searching the user information registered in the user information DB 65 based on those conditions. For example, if conditions of "lives in northern Kanto, 30 to 40 years old, male, has purchase history of sports-related products" are inputted, the user specifying unit 62 specifies users that correspond to those conditions from the user information DB 65. However, the users specified in the user specifying process S2 are limited to PSP registered users whose identification information (or printer email addresses) is already registered in the user information DB 65.

The user specifying unit 62 displays the number of users specified as a result of the search in the web page 71a. In addition, the user specifying unit 62 also displays an input field for inputting a number of pages of content in the web page 71a, and accepts an input of the number of pages of content from the businessperson through this input field. Based on the number of users specified as a result of the search and the number of pages of content whose input has been accepted, the user specifying unit 62 automatically calculates the expense (delivery expense) involved in the case where the content is delivered to all of the users, and displays a result of that calculation in the web page 71a. Now knowing the delivery expense, the businessperson inputs a content delivery order in the web page 71a in the case where the businessperson can approve the amount. In the case where the businessperson cannot approve the amount of a delivery expense that has been presented, the businessperson further narrows down the conditions (re-executes the user specifying process S2) to reduce the number of users that are delivery targets, and in the case where the delivery expense has ultimately become acceptable, inputs the content delivery order in the web page 71a.

Note that in addition to being executed by the PSP server 60, the stated user specifying process S2 may be executed by a dedicated external server that searches the PSP registered users in the user information DB 65 based on condition inputs, for example.

In the case where the input of such a content delivery order has been accepted, the print request unit 63 sends a content print request to the printing management server 20 (the printing service providing server 40) in response to the delivery order (a print request process S3). Specifically, the print request unit 63 reads out, from the user information DB 65, the identification information associated with the PSP registered users (the user ID (B)) specified by the user specifying process S2 carried out immediately after the input of the delivery order was accepted, and sends a print request including the read-out identification information, content data expressing the content, and the PSP management ID. If there are, for example, 50,000 PSP registered users specified by the user specifying process S2 carried out immediately after the input of the delivery order was accepted, the identification information for the 50,000 users is sent to the printing management server 20 in the print request.

As described thus far, according to this embodiment, the printer email addresses themselves are not excluded from being registered in the user information DB 65 of the PSP server 60. Accordingly, in the print request process S3, the printer email addresses associated with the specified PSP registered users (user ID (B)) may be read out from the user information DB 65, and the print request including the read-out printer email addresses, the content data, and the PSP management ID may then be sent. Accordingly, the print request unit 63 can be called a means that designates, to the printing management server 20 (the printing service providing server 40), a printer email address (or identification information corresponding to that printer email address) assigned to the printer 50 corresponding to the user specified in the user specifying process S2.

The "content data" is an image file expressing the stated content. The format of the image file is not limited. The content data may be data sent by the businessperson (the business terminal 70) to the PSP server 60, or may be data prepared (generated or inputted from the exterior) by the PSP server 60 in response to a request from the businessperson (the business terminal 70).

5. Printing Content in Response to Print Request

In the printing management server 20, the print request receiving unit 22 receives the stated print request from the PSP server 60 and passes the identification information included in the received print request to the identification information management unit 21.

The identification information management unit 21 queries the identification information DB 25 based on the identification information passed thereto, and specifies corresponding printer email addresses for each piece of identification information that matches the identification information passed thereto (an address specifying process S4). In other words, the identification information management unit 21 converts the identification information into the printer email address. The identification information management unit 21 passes, to the print instructing unit 23, a plurality (for example, 50,000) of printer email addresses specified in this manner. Note that the identification information management unit 21 may pass, to the print instructing unit 23, only printer email addresses corresponding to identification information that matches the identification information included in the print request and that is registered in the identification information DB 25 in association with the PSP management ID that matches the PSP management ID included in the print request.

The print instructing unit 23 registers the accepted printer email addresses and the content data included in the print request received by the print request receiving unit 22 in the print job DB 26 as a print job for each accepted printer email address. The print instructing unit 23 furthermore designates the accepted printer email addresses and instructs the email printing server 30 to cause each printer 50 corresponding to the designated printer email addresses to print the content data (a print instruction process S5).

At this time, the print instructing unit 23 designates the accepted printer email addresses to, of the plurality of email printing servers 30, 30, 30, and so on having different printer email addresses being administered, the email printing server 30 that administers the accepted printer email addresses, and instructs the stated email printing server 30 to cause the content to be printed. The designation of the printer email addresses to the email printing server 30 by the print instructing unit 23 is, in its simplest form, sending an email (an email in which the stated content data is an attached file) to those printer email addresses. Incidentally, the configurations of the printer email addresses differ in that at least part of the domain names thereof differ depending on the email printing servers 30 that administer those printer email addresses.

The email printing server 30 receives the emails sent to the printer email addresses of the printers 50 that the email printing server 30 itself administers. The email printing server 30 then causes the printers 50 corresponding to the addresses of the received emails (the printer email addresses) to print the content data as the stated attached files.

The configuration through which the email printing server 30 causes the printers 50 that the email printing server 30 itself administers to execute the print is known, and thus details thereof will be omitted; however, in the case where the printer 50 is itself in a power on state, for example, the printer 50 regularly (or irregularly) inquires with the email printing server 30 as to whether or not there is content data. Upon receiving the stated inquiry, the email printing server 30 notifies the printer 50 that there is content data in the case where content data to be printed by the printer 50 that made the inquiry is present. As a result, the printer 50 downloads the content data from the email printing server 30 and prints the content data (outputs paper on which the content has been printed). Note that a process for converting the content data into data in a format required for printing by the printer 50 (for example, print data defining whether or not to form an ink droplet on a pixel-by-pixel basis) may be executed by either the email printing server 30 or the printer 50.

Having finished printing the content, the printer 50 sends a notice indicating that the printing is complete (a printing complete notice) to the email printing server 30. Upon receiving the printing complete notice from any printer 50, the email printing server 30 transfers that notice to the printing management server 20. Meanwhile, upon receiving the (transferred) printing complete notice from any printer 50, the printing management server 20 sets a flag indicating printing is complete in the print job corresponding to that printer 50 (the print job registered in the print job DB 26 for the printer email address corresponding to that printer 50). Whether or not printing of a print job for any printer 50 is complete can be known as a result of the printing management server 20 setting a flag in the print job DB 26 in this manner.

Note that as described above, there are cases where the printer email address is sent from the PSP server 60 in the print request instead of the identification information. In such a case, the address specifying process S4 is unnecessary, and the email printing server 30 (the printing service providing server 40) accepts the designation of the printer email address included in the print request.

6. Providing Points

The PSP server 60 includes the point management unit 64 that manages, for each PSP registered user (each user ID (B)) points that can be used for predetermined services (services provided by businesses affiliated with the PSP and so on). The point management unit 64 provides a predetermined amount of points to the PSP registered users specified as content delivery targets. Here, the point management unit 64 may provide points to all of the PSP registered users specified in the user specifying process S2, or may provide points only to those PSP registered users who have actually printed content.

Specifically, in the case where the stated flag indicating that printing is complete has been set for a print job associated with a given printer email address registered in the print job DB 26, the printing management server 20 sends, to the PSP server 60 corresponding to the PSP management ID registered in the identification information DB 25 in association with that printer email address, an opening confirmation notice in which that printer email address (or the identification information corresponding to that printer email address) is denoted. When the opening confirmation notice is received on the PSP server 60 side, the point management unit 64 specifies the PSP registered user (user ID (B)) associated with the printer email address (or identification information) denoted in the opening confirmation notice from the user information DB 65 and provides the predetermined amount of points to the specified PSP registered user. Here, the "predetermined amount of points" is, for example, an amount of points that compensates for the economic cost of printing the content (ink and toner costs, paper costs, and so on), or a higher amount of points to provide an increased incentive.

The point management unit 64 may provide points to PSP registered users who have printed content within a limited period of time. This is because depending on the announcement made in response to a request from a businessperson, there are cases where the announcement serves no purpose unless users receive the announcement within a given period of time. For example, assume a businessperson has requested the PSP server 60 to deliver an advertisement (content) for a winter clothing sale to female users in their twenties in November of 2014. In this case, the point management unit 64 may provide the stated predetermined amount of points to PSP registered users who successfully received the content within a period of time designated by the businessperson (for example, from November of 2014 to January of 2015), as specified by the opening confirmation notice.

In addition to the stated delivery expense, the economic cost of providing the points to the PSP registered users specified as content delivery targets in this manner is covered by the businessperson who requests the content to be delivered. In this embodiment, the method used for monetary exchanges between the businessperson and the PSP is not particularly limited.

In addition, the specific format of the points provided to the PSP registered users by the point management unit 64 is not particularly limited. For example, the points are returned to users in a variety of formats having set values, such as so-called e-money or virtual currency, gift certificates, cash (cash back), items (free gifts), and so on.

7. Effects of the Embodiment

According to this embodiment, the printer email address assigned to the printer 50 is anonymized by the identification information. The identification information itself is information whose meaning cannot be deciphered by a person who sees the information. Meanwhile, only the printing management server 20 can convert the identification information into the printer email address. As such, even if the identification information has been leaked, this leak will not result in the printer email address being leaked. Accordingly, printing that is unnecessary to the user U of the printer 50 being executed due to the printer email address being leaked, which has been a problem in the past, can be avoided, which eliminates economic losses for the user due to ink and toner, paper, and so on being consumed. Furthermore, the process for converting the identification information into the printer email address carried out by the printing management server 20 is a comparatively low-load process, and it is not necessary to use a complex authentication system for preventing the printer email address from leaking as in the past; thus a large number of printers 50 can print safely and easily.

Furthermore, according to this embodiment, it is not necessary for a businessperson who wishes to deliver the stated announcement (content) to specifically obtain the personal information (user information) of the users who are delivery targets. In other words, by providing conditions of users who are to be delivery targets to the PSP server 60, the businessperson can make a desired announcement to many users who match those conditions (that is, cause the printers 50 of the users to print the content using the PSP server 60 and the printing service providing server 40). In addition, the delivery (printing) of content using the PSP server 60 and the printing service providing server 40 in this manner greatly reduces the time and costs required compared to typical direct mailing (DM) through the post or the like. This is valuable to the businessperson in that the burden of collecting personal information can be eliminated and the desired announcements can be made quickly and cheaply.

Furthermore, eliminating the need for the businessperson to collect personal information complies with recent demands for increased personal information security, and contributes greatly to the weakening of so-called "name list traders" who buy and sell peoples' personal information.

Furthermore, as is clear from the foregoing descriptions, the print request unit 63 of the PSP server 60 notifies the printing service providing server 40 of the printer email address or the identification information uniquely associated with the printer email address in the information managed by the user information management unit 61, but does not notify the printing service providing server 40 of the user information. Accordingly, the personal information (user information) of the PSP registered users held by the PSP server 60 is prevented from being leaked to the exterior.

Furthermore, according to this embodiment, the stated predetermined amount of points are given to the user U of the printer 50 (who is also a PSP registered user) specified as a content delivery target (or who has actually printed the content). Accordingly, the user U no longer needs to worry about the economic cost of printing the content; on the contrary, the user U gains advantages due to the aforementioned incentives, which serves to increase the user U's motivation to print the content. The businessperson can therefore realize significant marketing benefits, which easily results in an improvement in business profits.

8. Variations

Figure 6:
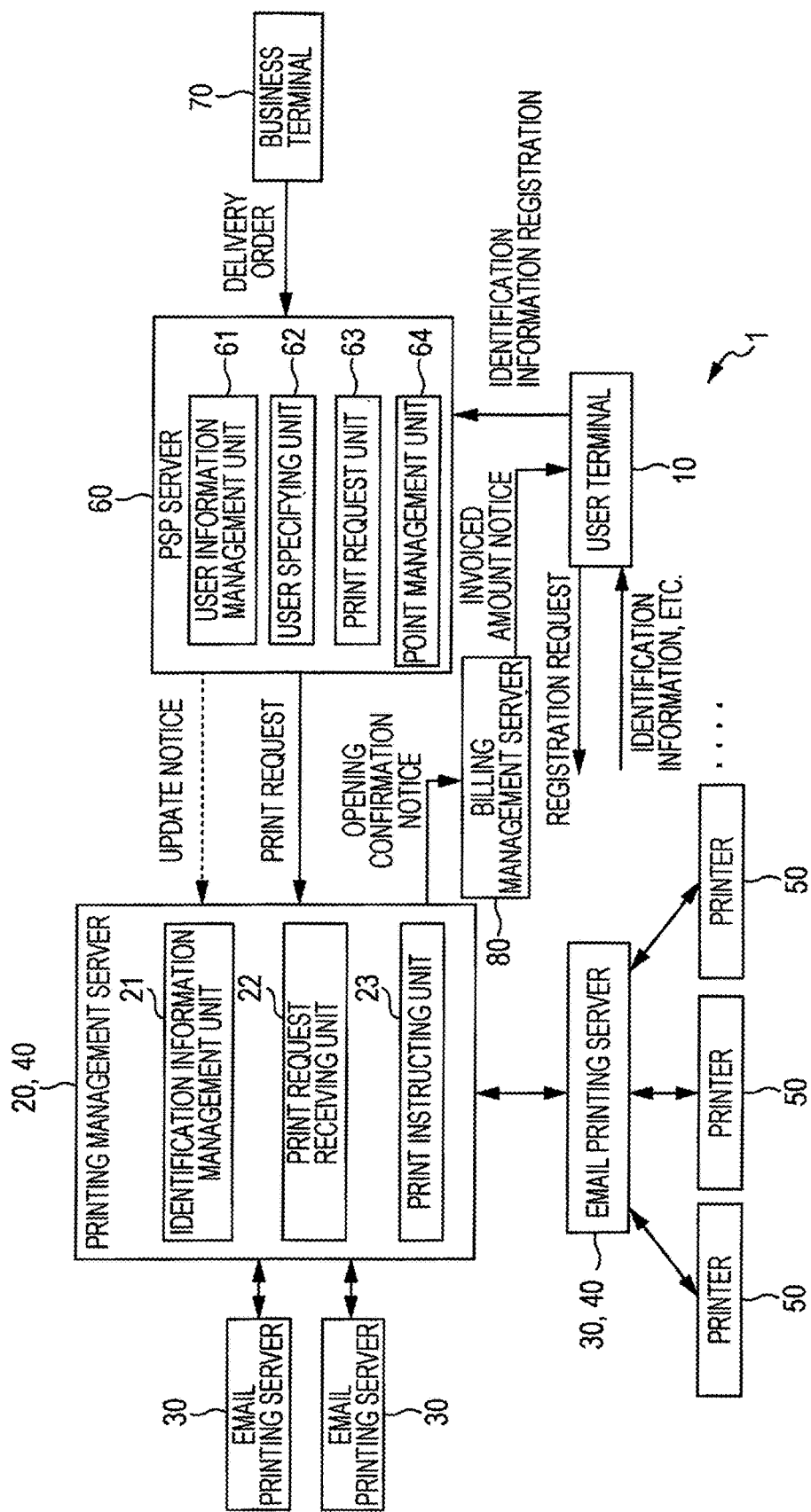
FIG. 6 is a diagram schematically illustrating a system according to a variation.

FIG. 6 schematically illustrates the configuration of a system 1 according to a variation on the aforementioned embodiment, and differs from the system illustrated in FIG. 1 in that a billing management server 80 is provided. The billing management server 80 constitutes part of a billing system that, by making a contract with a user for flat-rate billing over a set period (for example, on a monthly basis), provides predetermined products or services to the user who has entered into the contract (a contracted user). For example, by entering into a contact with a billing system run by a business that manufactures and sells the printer 50, a user U of the printer 50 can lease the printer 50, receive consumables such as ink and toner, paper, and so on, receive maintenance services, and so on within the scope of the flat-rate billing set forth in the contract. As part of this functionality, the billing management server 80 sequentially manages the monthly invoice amounts for each contracted user, notifies contracted users of the invoice amounts at predetermined times, and so on, for example.

In the case where such a billing management server 80 is incorporated into the system 1, the printing management server 20 sends the opening confirmation notice to the billing management server 80. Note that this variation assumes that the user U of the printer 50, who is the PSP registered user, is also the aforementioned contracted user. Having received the opening confirmation notice, the billing management server 80 specifies the contracted user who matches the PSP registered user specified by the opening confirmation notice. For example, the opening confirmation notice is also sent to the PSP server 60, and the PSP server 60 notifies the billing management server 80 of the PSP registered user specified by the PSP server 60 based on the opening confirmation notice. The billing management server 80 has a DB in which, for example, PSP registered users and contracted users are associated with each other, and can thus specify the contracted user by referring to this DB.

The billing management server 80 carries out a process for, for example, subtracting an amount equivalent to the stated predetermined amount of points from the invoice amount for the specified contracted user, and sets the amount obtained after the subtraction process as the invoice amount for the contracted user. The billing management server 80 then notifies the contracted user of the invoice amount determined in this manner by sending that invoice amount to a sending destination (the user terminal 10 of the user U) registered by that contracted user in advance. According to this variation, the user U is compensated for the economic cost of printing the content through a reduction in the invoice amount by the billing system, and thus the rate at which the content is printed is increased.

What is claimed is:

1. A printing management server comprising:
a CPU including
an identification information management unit that generates and manages identification information uniquely associated with an email address assigned to a printer, the identification information being information whose meaning is not deciphered by a person viewing the information,
a print request receiving unit that receives a print request that is a request to print content, the print request including the identification information without including an email address, and
a print instructing unit that converts the identification information included in the print request specified by the identification information management unit to an email address corresponding to the identification information, and instructs an email printing server to cause a printer corresponding to the email address to print content included in the print request.

2. The printing management server according to claim 1, wherein in response to a printer registration request from an external terminal, the identification information management unit generates the identification information associated with an email address assigned to the printer to be registered, registers the generated identification information in association with the email address, and sends the registered identification information to the external terminal that made the registration request.

3. The printing management server according to claim 1, wherein the print instructing unit designates the email address to, of a plurality of email printing servers that administer different email addresses, the email printing server that administers the specified email address, and instructs the stated email printing server to cause the content to be printed.

4. A printing system comprising:
a printing management server, and an email printing server that causes a printer corresponding to a designated email address to execute a print,
the printing management server including a CPU which includes an identification information management unit that generates and manages identification information uniquely associated with an email address assigned to a printer, the identification information being information whose meaning is not deciphered by a person viewing the information, a print request receiving unit that receives a print request that is a request to print content, the print request including the identification information without including an email address, and a print instructing unit that converts the identification information included in the print request specified by the identification information management unit to an email address corresponding to the identification information, and instructs the email printing server to cause a printer corresponding to the email address to print content included in the print request, and
the email printing server causes the printer corresponding to the designated email address to print the content included in the print request.

* * * * *